United States Patent [19]

Angold

[11] Patent Number: 4,459,902

[45] Date of Patent: Jul. 17, 1984

[54] DEEP FAT COOKING APPARATUS

[76] Inventor: Raymond H. Angold, 28 Wallace Pl., Kingston, Ontario, Canada, K7M 6B9

[21] Appl. No.: 421,835

[22] Filed: Sep. 23, 1982

[30] Foreign Application Priority Data

Nov. 23, 1981 [CA] Canada .................................. 390642

[51] Int. Cl.$^3$ ....................... A47J 27/00; A47J 27/08; A47J 37/12

[52] U.S. Cl. .................................... 99/330; 99/332; 99/337; 99/344; 99/403

[58] Field of Search ................. 99/330, 327, 336, 328, 99/403–418, 342, 337, 338, 331, 332, 344; 426/438

[56] References Cited

U.S. PATENT DOCUMENTS 2,532,639 12/1950 Payne .
3,410,199 11/1968 Quednau .
3,655,411 4/1972 Albright .
3,701,313 10/1972 Boggs .
4,041,852 8/1977 Keating .

FOREIGN PATENT DOCUMENTS 955416 10/1974 Canada .
962515 2/1975 Canada .
1051210 3/1979 Canada .

Primary Examiner—Timothy F. Simone

Attorney, Agent, or Firm—Stevens, Davis, Miller & Mosher

[57] ABSTRACT

Apparatus for the cooking of foods, includes a chamber for holding a volume of cooking oil and defining a cooking region therein for receiving food to be cooked. The chamber includes a wall having an opening therethrough for placement of food into the cooking region of the chamber and removal of the food therefrom. Displacement means are provided within the chamber adjacent the cooking region and movable between (a) a first oil displacing position wherein, in use, with a selected amount of cooking oil in the chamber, the upper level of the oil is sufficiently high that the oil substantially surrounds the food to be cooked; and (b) a second substantially non-oil displacing position wherein the upper level of the selected amount of oil is below both the lower extremities of the opening and the food. The wall opening is positioned and arranged such that, in use, the food may be inserted and removed from the cooking region of the chamber in a lateral or horizontal direction. The chamber is capable of withstanding internal pressures during the cooking of the food. Movable closure means are associated with the opening in the wall and are sealingly engageable with the chamber to prevent leakage when under pressure during cooking. Heating means are also provided within said chamber for supplying heat to the cooking oil.

7 Claims, 7 Drawing Figures

DEEP FAT COOKING APPARATUS

BACKGROUND OF THE INVENTION

This invention relates to improvements in deep fat cooking apparatus.

It is now common practice in the case of some foods to cook them in a heated liquid such as hot fat, under pressure, rather than in open fryers. This method of cooking has been particularly successful in the cooking of chicken and has given rise in substantial measure to the popularity of fried chicken. As is well known, the cooking of food in fat and in containers designed to keep the food under pressure while cooking can utilize the natural moisture contained in the food to produce the desired pressure. Initially, some moisture in the food being cooked is vapourized by the hot fat and the resulting steam creates a pressure in the closed container. In some instances, where desired, the pressure within the cooking chamber can be enhanced or created by other means.

It is well known that the cooking of food in fat under pressure has a number of advantages over and above the open fryer method for the cooking of certain foods. The above-atmospheric pressure raises the boiling point of the moisture in the food with the result being that the food reaches a higher temperature than in the open fryer method and this in turn reduces the cooking time. Food thus cooked also retains more moisture than would be the case in open fat frying and furthermore there is less tendency for the food to absorb fat thus not only reducing the amount of fat consumed by the cooking operation but also producing a cooked product which is tender and palatable. In the case of foods which have been spiced or seasoned, the increased pressure results in better impregnation and distribution of the spices or seasonings into the food.

The prior art has provided a wide variety of deep fat fryers. At the present time, the standard type of equipment used for cooking chicken under pressure in "take-out stores", such as the Colonel Saunders Kentucky Fried Chicken (trademark) operation is generally as follows. The pressure cooker is of the deep pot type having built-in heating elements. In use, the portions of chicken are manually dropped into the hot exposed oil. After cooking, the cooked pieces are removed manually. This necessitates time consuming sorting and placing of chicken onto racks before placing same into a warming closet. If the personnel fail to remove the chicken at the right time, it will become overcooked thus producing a poor product. The above equipment and procedure is usually used to cook two to four chicken at one time (eighteen-thirty-six pieces). In an average "take-out store" this requires several cookers, much space, and a relatively large staff. Expensive equipment is also required to remove excess heat and steam from the kitchen area. There is also a certain amount of danger involved in the operation in that hot oil may be splashed on personnel when the pieces of chicken are being manually lowered into or raised out of the hot exposed oil.

SUMMARY OF THE INVENTION

It is an object of the present invention to alleviate the above-noted disadvantages of conventional equipment and to provide improved deep fat cooking apparatus which is relatively simple to operate, and which at the same time is relatively safe to operate in that the food is never immersed or withdrawn manually from hot cooking oil.

Further objectives of the invention are to provide improved deep fat cooking apparatus requiring less manual handling of foodstuffs; which apparatus provides for a relatively large variable capacity, which apparatus allows for relatively low maintenance costs because of its simplicity, which apparatus need utilize relatively little floor space, and which apparatus may be fitted with automatic control devices whereby to substantially eliminate human errors in the timing of the cooking cycle.

In accordance with the invention in one aspect there is provided apparatus for the cooking of foods comprising: a chamber for holding a volume of cooking oil and defining a cooking region therein for receiving food to be cooked; the chamber including a wall having an opening therethrough for placement of food into the cooking region of the chamber and removal of the food therefrom, and displacement means within said chamber adjacent said cooking region and movable between (a) a first oil displacing position wherein, in use, with a selected amount of cooking oil in said chamber, the upper level of the oil is sufficiently high that the oil substantially surrounds the food to be cooked; and (b) a second substantially non-oil displacing position wherein the upper level of the selected amount of oil is below both the lower extremities of said opening and the food.

As a further feature of the invention, said opening in said wall is positioned and arranged such that, in use, the food may be inserted and removed from the cooking region of the chamber in a lateral or horizontal direction.

As a still further feature of the invention, said chamber is capable of withstanding internal pressures during the cooking of the food, and movable closure means associated with said opening in said wall and sealingly engageable with the chamber to prevent leakage when under pressure during cooking; and heating means within said chamber for supplying heat to the cooking oil.

The above-noted displacement means typically comprises a body of selected volume mounted within the chamber for movement between the first and second positions. Means accessible from a location externally of the chamber are provided for effecting movement of such body between the first and second positions. In the preferred form of the invention the displacement means comprises a drum mounted for rotation about an axis, the drum being shaped such that it displaces the oil in the first position but displaces no oil in the second position.

In the preferred form of the invention, means are provided for venting the chamber after the cooking of the food to relieve the pressures in same. Safety stop means are preferably provided for preventing the opening of the chamber closure means until the displacement means has been moved to the second position and the pressure removed.

The preferred embodiment of the invention employs latch means for holding the displacement means in the oil displacing first position together with means for releasing such latch means to allow the displacement means to move to the second position when desired.

Typical apparatus according to the invention also includes a control circuit for timing the cooking of the food, controlling the temperature of the cooking oil, and activating the means for releasing the above-noted latch after the cooking of the food.

In a preferred form of the invention, the above-noted means for rotating the displacement drum comprises a control wheel directly connected to such drum via a shaft. Cam means are typically provided on the control wheel for activating the control circuit and controlling the functioning of the safety stop means etc.

Further features and advantages of the invention will be apparent from the following description of a preferred embodiment of same.

BRIEF DESCRIPTION OF THE VIEWS OF DRAWINGS

Drawings which illustrate an embodiment of the invention:

DETAILED DESCRIPTION OF PREFERRED EMBODIMENT

Figure 1:
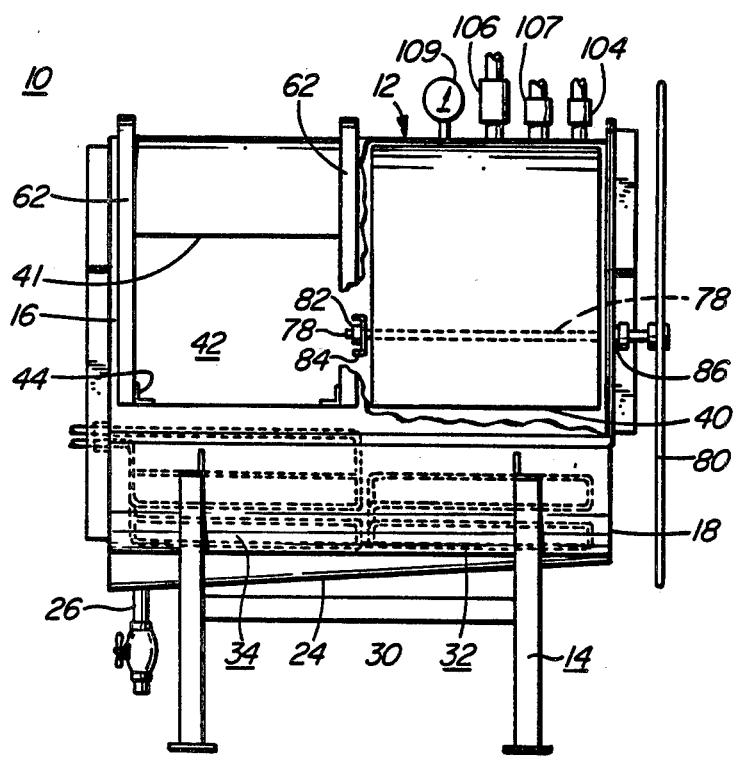
FIG. 1 is side elevation view of the deep fat cooking apparatus, portions of such view being cut away to show the displacement drum with the heating elements etc. being shown in phantom.

Referring to the drawings, the cooking apparatus 10 includes a horizontally disposed chamber 12 positioned on a support frame 14. Chamber 12 includes generally flat opposed end walls 16 and 18 and arcuate top and bottom walls 20 and 22, both of the latter defining generally cylindrical surface segments, with the bottom wall 22 being outwardly stepped radially relative to the top wall 20. The bottom wall 22 also includes a tapered arcuate trough-like portion 24 extending lengthwise of the chamber with a drain pipe 26 being connected to the lowermost portion of the deep end of the trough. This trough-like portion 24 tends to collect food particles and these particles together with all or a portion of the cooking oil are drained off periodically through the drain pipe 26.

The chamber 12 is preferably made of stainless steel whereby to avoid corrosion and possible contamination of the cooking oil. The chamber 12 is constructed so as to withstand the internal pressures which occur during use, such pressures typically ranging in the range of 10-20 psi. The opposing end walls 16 and 18 are provided with suitable brace members 28 thereby to assist them in withstanding the internal pressures.

Furthermore, in order to avoid excessive heat loss from the chamber, the entire chamber is covered with a layer of insulation (not shown) the latter, in turn, being clad with a layer of thin sheet metal, such as stainless steel, whereby to provide a clean and attractive appearance.

Figures 2, 3:
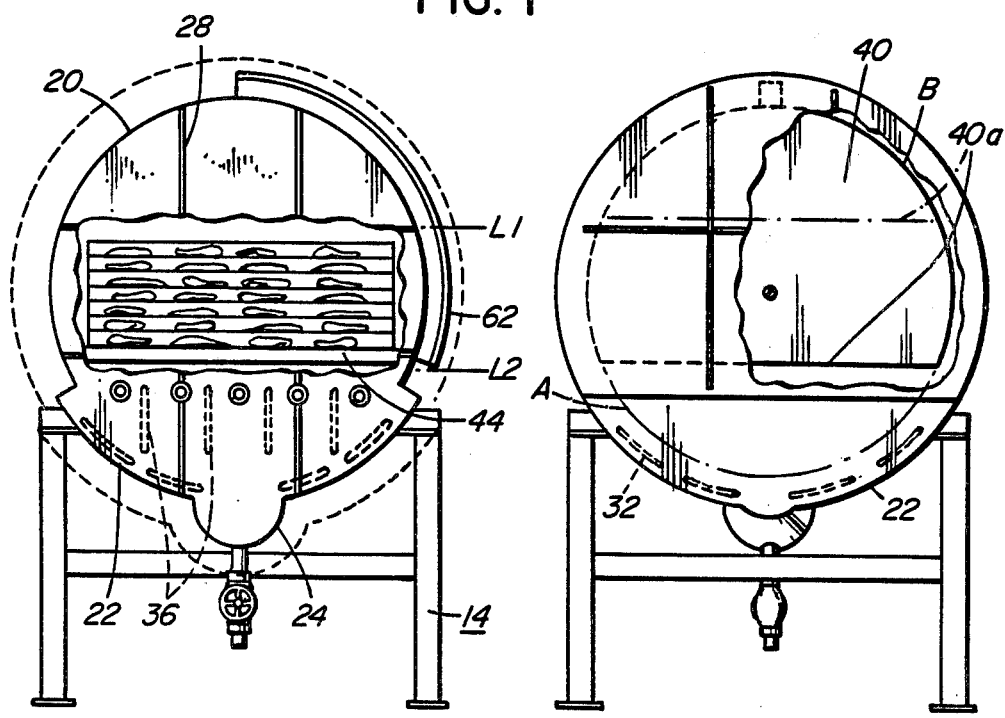
FIG. 2 is an end elevation view of the cooking apparatus, a portion of the end wall being cut away to show foodstuffs supported on stacking trays within the cooking apparatus, with the cooking elements being shown in phantom.
FIG. 3 is an elevation view of the opposite end of the cooking apparatus with such end partially cut away to show the drum in its first and second positions.

The lower portion of the chamber interior is fitted with a series of electrical heating elements of any well known commercially available variety such as those known under the "Chromaloy" (trademark). To avoid contamination of the cooking oils, such heating elements are provided with a substantially inert sheath of material such as "Incoloy" (trademark) with the elements being provided with suitable stainless steel end fittings. With particular reference to FIGS. 1 and 2, it is to be noted that the heating elements 30 comprise two main groups, the first group 32 being situated directly below displacement drum 40 (to be described fully hereinafter) and a second group 34 disposed directly below cooking region 42. The group of heating elements 32 below displacement drum 40 all extend generally longitudinally of the chamber 12 and are disposed closely adjacent the inner surface of the bottom wall 22 of the chamber. The second group 34 of elements comprises, as seen in FIG. 2, a first set of such elements extending lengthwise of the chamber and disposed closely adjacent the inner surface of the bottom wall 22 of the chamber and a still second set of elements 36 lying in generally vertically oriented planes in horizontally spaced parallel relation to one another.

The wall of chamber 12 includes a rectangular opening 41 therein which leads into the previously mentioned cooking region 42. In order to provide for support of trays or racks of food to be cooked, guide and support members in the form of a spaced parallel pair of angle members 44 are provided which extend transversely of the interior of chamber 12 in parallel relationship to one another adjacent the lower extremities of the cooking region 42 as illustrated in FIGS. 1 and 2. It will readily be seen from the drawings that the opening 41 and the guide and support means 44 are arranged such that, in use, the racks of food to be cooked may be inserted and removed from the cooking region 42 of the chamber in a generally horizontal direction.

The "dead volume" existing above the cooking region may be filled up with any suitable means if desired in order to permit a more rapid build-up of steam pressure especially in the case where only a small batch of food (especially chicken) is being cooked.

Figure 4:
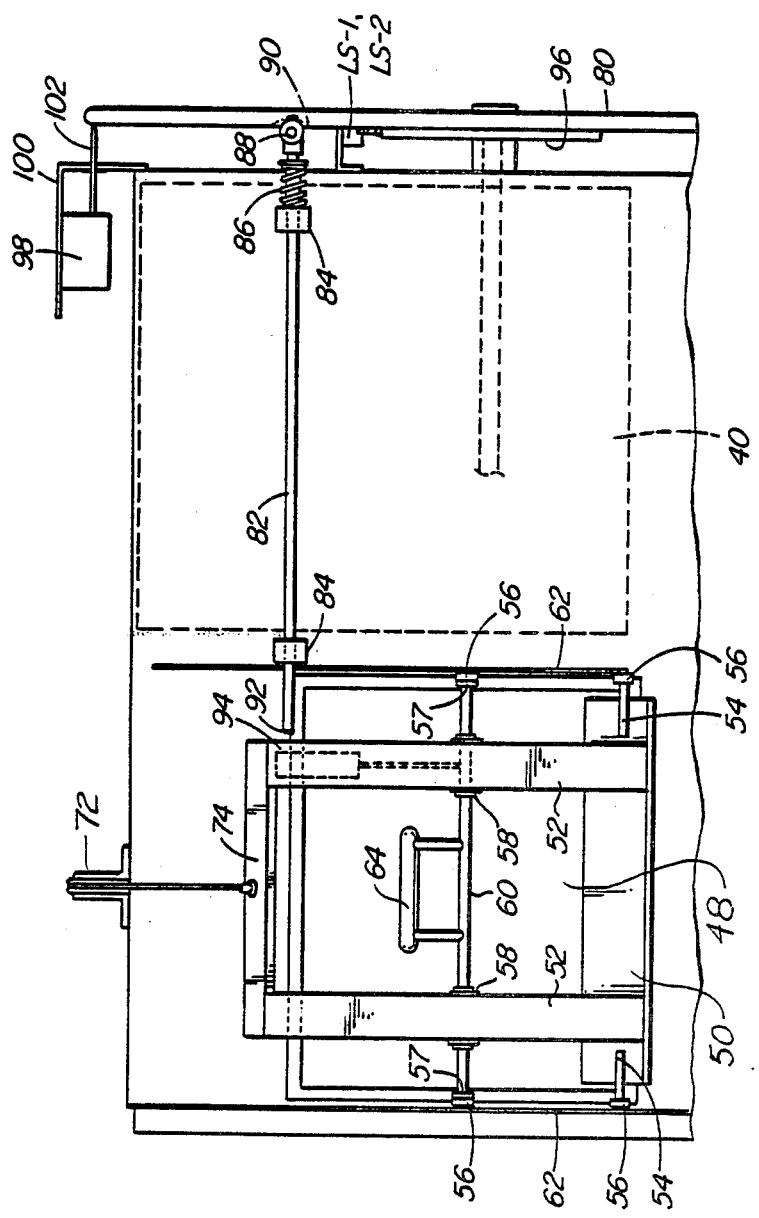
FIG. 4 is a view of a portion of the chamber illustrating certain details of the movable closure for the cooking chamber and the safety stop means associated with same.
Figure 5:
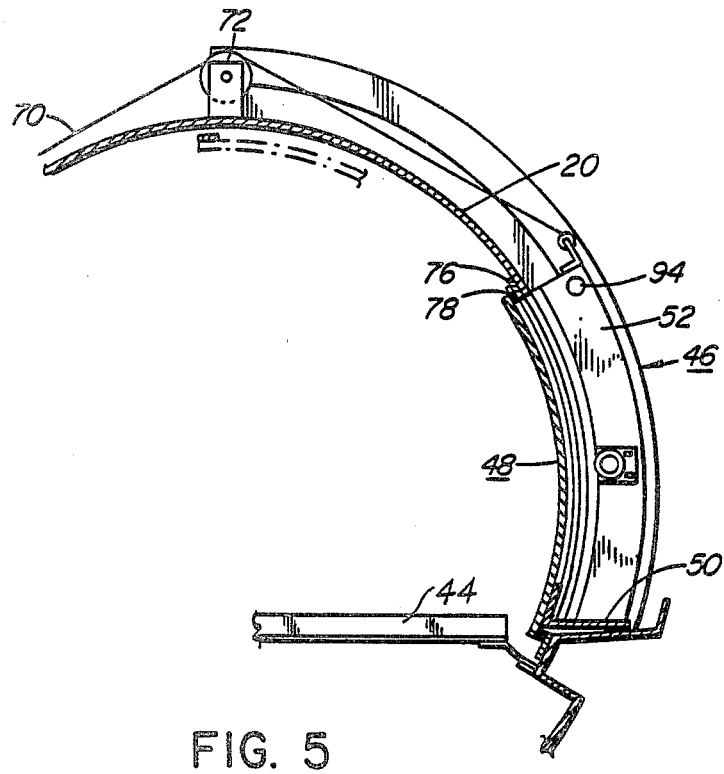
FIG. 5 is a partial section taken along line 5—5 of FIG. 4 illustrating further details of the movable closure means.

The opening 41 leading into cooking region 42 is provided with a closure assembly 46 (see FIGS. 4 and 5) which is sealingly engageable with the chamber walls to prevent leakage therebetween when under pressure during cooking. The closure assembly 46 includes an arcuately curved closure door 48, the outside dimensions of which are somewhat greater than the dimensions of the opening 41. With reference to FIG. 5 it will be seen that closure door 48 is disposed inwardly of the arcuate upper wall 20 of chamber 12 and is supported for movement in an arcuate path by means of a transversely arranged channel carrier 50 welded to the exterior of door 48 adjacent but spaced from the lower edge of the door, the carrier 50, in turn, being welded to a transversely spaced apart pair of rigid arcuately curved suspension channels 52 as best seen in FIG. 4. The opposite ends of the carrier channel are provided with outwardly projecting axles 54 each outfitted with a respective guide roller 56. Suspension channels 52 are also outfitted with brackets 58 through which passes an elongated guide rod 60, the outer ends of which are outfitted with suitable guide rollers 56. In order to guide the closure door 48, channel carrier 50 and suspension channels 52 in the required arcuate path, a pair of spaced, parallel, arcuate guide channels 62 are provided, the latter being connected to wall 20 and extending in flanking relationship to the opening 41 leading into the cooking chamber. These guide channels 62 receive the aforementioned guide rollers 56 and extend from points closely adjacent the lower extremity of the door opening 41 to points disposed in the plane of symmetry of the chamber 12 at the very top of the latter. Cams 57 are located immediately inwardly of the rollers 56 and are affixed to rod 60. These cams are arranged to co-act with guide channels 62 and that when rod 60 is rotated by handle 64 at the closed position, the door 48 is drawn outwardly into sealing contact with the chamber wall. Guide channels 62 are clearly illustrated in FIGS. 1 and 2. To facilitate the lifting of closure door 48 and the associated assembly, the handle 64 is connected to the central region of support rod 60 and, in addition, a suitable counterweight (not shown) is connected to a flexible line 70, the latter passing over a small pulley 72 at the top of chamber 12 and being connected to the center point of a cross member 74 which is welded to the upper extremities of the spaced apart cover suspension channels 52.

With further reference to FIG. 5 it will be noted that the perimeter of the opening 41 is reinforced by means of relatively thin steel strips 76 which are welded to the interior surface of chamber wall 20 all around opening 41 thus providing a reinforcing frame for such opening. Furthermore, in order to prevent loss of pressure during the cooking operation, the peripheral portions of closure door 48 are provided with a gasket 78 extending completely therearound. This gasket 78 comes into sealing engagement with the perimeter framing strips 76 as previously described thus providing for sealing engagement therebetween.

With the above-described arrangement, the closure door 48 may readily be opened and closed by grasping handle 64 whereupon guide rollers 56 are caused to move along their associated guide channels 62 between the full line position of closure door 48 and the dashed line position for same as best illustrated in FIG. 5.

The previously noted displacement drum 40 comprises a drum which is cylindrical except that a segment of the cylinder has been replaced with a flat wall 40a, such drum mounted for rotation about an axis corresponding to the longitudinal axis of the cylindrical portion of the drum (such axis thus being offset from and parallel to the centroidal axis of the volume defined by the drum) by means of a shaft 78 which extends part way along the central axis of chamber 12, from a point closely adjacent the cooking region 42, along and through end wall 18, and projecting outwardly therefrom a short distance and being connected to a control wheel 80. Shaft 78 is journalled at its inner end in a bearing 82, the latter being supported by means of a transversely extending support channel 84, the latter being connected at its opposing ends to the interior walls of chamber 12. End wall 18 is provided with a suitable bushing 86, the latter being provided with a packing gland assembly (not shown) thereby to prevent escape of steam and/or hot liquids around the shaft during the cooking process.

As control wheel 80 is rotated, the displacement drum 40 is rotated between a lower, oil displacing position A to an upper non-oil displacing position B, both as illustrated in dashed lines in FIG. 3. In the lower position A, with a selected amount of cooking oil in such chamber, the level of such oil is raised upwardly within the cooking region 42 such that it substantially surrounds the food to be cooked. This upper level of the cooking oil is designated by the reference L1 in FIG. 2. With the displacement drum 40 rotated to the upper non-displacing position B, the level of the cooking oil drops below the food and slightly below the lower level of the door opening 41, such level being designated by L2 in FIG. 2. Since the volume of liquid required to raise the liquid level from L2 to L1 within the cooking region 42 can readily be calculated, this enables one, in turn, to calculate the required dimensions of the displacement drum 40. Since these calculations can readily be made, no further discussion is considered necessary.

Figure 6:
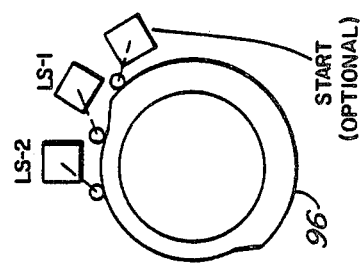
FIG. 6 is a schematic diagram of the cam means associated with the master control wheel and certain limit switches associated with same.

The various safety and control systems associated with the apparatus will now be described with particular reference to FIGS. 4, 6 and 7.

Referring firstly to FIG. 4, there is shown a safety stop means preventing opening of the chamber closure assembly 46 until the master control wheel 80 has been moved to a predetermined angular position. The safety stop includes an elongated rod 82 movable to and fro within brackets 84 connected to the chamber wall. The rod is biased by spring 86 toward the outer rim of control wheel 80. The outer end of rod 82 is provided with a fitting including a roller 88 which contacts the rim of wheel 80. At one location around the periphery of wheel 80 there is provided an arcuately contoured cutout or notch 90. When the wheel is turned to the predetermined position, roller 88 enters into notch 90 with the result being that rod 82 moves endwise to the right as shown in FIG. 4. In this position, the opposing end 92 is clear of, i.e. slightly spaced from, cover suspension channel 52 and hence the closure door 48 can be moved to the open position by the operator. However, when the control wheel 80 is rotated, the roller 88 rolls out of the notch 90 thus forcing rod 82 endwise toward suspension channel 52 and into an aperture 94 provided therein (see FIG. 5). With the end portion 92 of the rod disposed in aperture 94, it is not possible for the operator to accidentally open the closure assembly. This is an important safety feature.

As a further safety feature, a small block can be slidably mounted in the suspension channel 52 next adjacent to aperture 94, such block being connected by linkage to the rod 60. The block will have a hole therein such that as the block is moved by rotation of rod 60 to the sealed position of the door, the hole in the block comes into registry with aperture 94 thus allowing rod 82 to move endwise sufficiently as to allow control wheel 80 to be rotated. When handle 64 and rod 60 are in the non-sealing position the block is in a position such that it prevents sufficient endwise movement of rod 82 as to permit rotation of control wheel 80, i.e. the latter is prevented from rotating until the closure door 48 is sealed tight by virtue of the action of cams 57. This further serves to prevent inadvertent rotation of wheel 80 and attendant spillage of hot oil, and possible injury to personnel.

A control cam 96 (FIG. 6) is connected to control wheel 80 for rotation with same, such control cam having switches LS1 and LS2 associated therewith for purposes to be described hereinafter.

Referring again to FIG. 4, there is shown a latch solenoid 98 connected to chamber 12 via bracket 100. The solenoid plunger 102 extends to a point closely adjacent the rim of control wheel 80. The rim of control wheel 80 is provided with an aperture sized to admit solenoid plunger 102 when the latter is in the extended position. This aperture is located at a position corresponding to the lower position A of displacement drum 40.

The chamber 12 is also provided with a solenoid activated vent valve 104. In operation, valve 104 is activated thereby to release the steam pressure from chamber 12 prior to opening same and removing the cooked food. Chamber 12 is also provided with a pressure relief valve 106 of any suitable conventional construction as well as suitable means (not shown) for sensing the temperature of the cooking oil within the chamber. Also shown in FIG. 1 is a pressure gauge 109 and an adjustable pressure control valve 107 which can be set to vent steam at any desired pressure.

Figure 7:
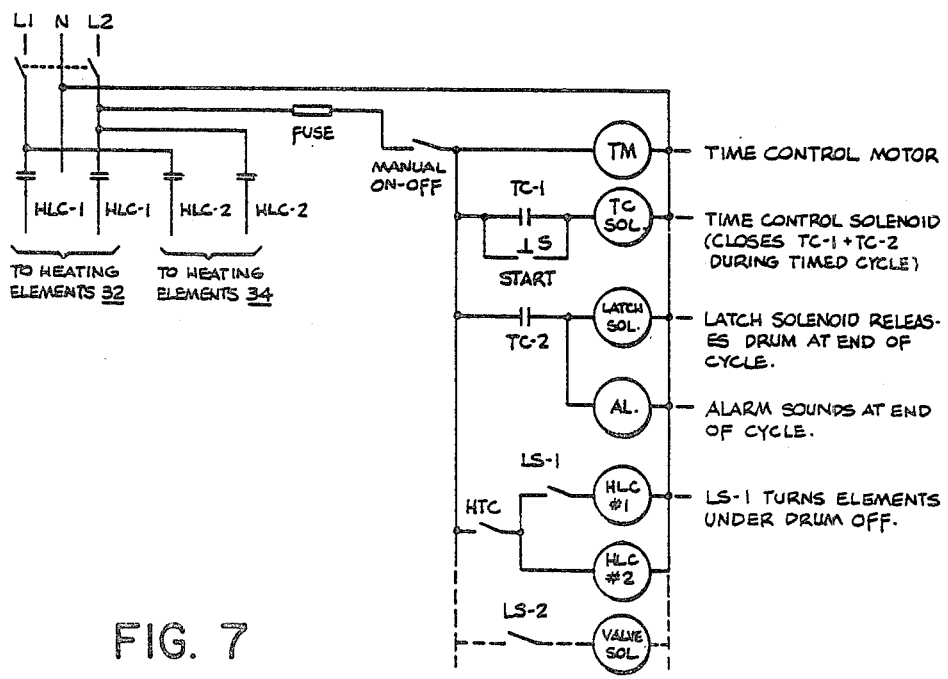
FIG. 7 is a schematic diagram of the electrical control circuitry.

Reference will now be had to the control circuit of FIG. 7. This will be largely self-explanatory. Contacts HLC-2 control the flow of current to the heating elements 34 positioned beneath the cooking region 42. Contacts HLC-1 control the flow of current to the heating elements 32 positioned beneath the displacement drum. With continued reference to the control circuit, the start button S closes a circuit through time control solenoid TCS. This time control solenoid, immediately upon activation, closes in turn contacts TC-1 and TC-2 and maintains same in the closed condition during the timed cooking cycle. Contacts TC-2 energize latching solenoid 98 as described previously thus holding the displacement drum 40 in the down or liquid displacing position A illustrated in FIG. 3. Contacts TC-2 also control an alarm AL which is arranged to sound at the end of the cooking cycle. Contacts HTC are controlled by the above-mentioned temperature sensor which responds to the temperature of the cooking oil within chamber 12. These contacts control the flow of current through solenoids HLC-1 and HLC-2 which, in turn, control the above-described contacts controlling the flow of current through heating elements 34 and 32. Switch LS-1, in turn, overrides the temperature control system and functions, via solenoid HLC-1, to turn elements 32 under displacement drum 40 off when the drum is in the position A as will be described more fully hereinafter. The solenoid controlled vent valve 106 is activated and de-activated via switch LS-2. Switches LS-1 and LS-2, as noted previously, are controlled via control cam 96 mounted to control wheel 80.

In the operation of the apparatus it will be assumed that the master control wheel 80 has been rotated to bring displacement drum 40 into the upper position B as shown in FIG. 3. With the master control wheel in this position, switch LS-1 is closed and hence current can flow through both sets of contacts HLC-1 and HLC-2 to the associated elements 34 and 32 thereby to bring the cooking oil up to the desired cooking temperature.

When the cooking oil has reached the prescribed temperature, the closure assembly 46 is opened and the foodstuffs to be cooked inserted horizontally into the cooking region 42. The pieces of food are supported on a rack arrangement comprising a plurality of stacked trays, the trays being of an open wire mesh construction thereby to allow free drainage of oil therethrough. This rack arrangement is slid into the cooking region 42 on the previously described support and guide means 44. Following this the closure assembly 46 is closed by bringing the closure door 48 into sealing engagement with the wall of chamber 12. Following this the control wheel 80 is rotated thus moving the end portion 92 of rod 82 into aperture 94 thus preventing opening of the closure assembly. The continued rotation of control wheel 80 causes the displacement drum to be rotated into position A, raising the level of cooking oil sufficiently to cover the foodstuffs located in the cooking region. At this point, the start button S is activated thus energizing time control solenoid TCS which in turn closes contacts TC-1 and TC-2. (If desired, switch S may be activated by means of a suitable limit arm arranged to come into contact with the cam means provided on control wheel 80.) At the same time as the displacement drum is being rotated to position A, switch LS-2 is closed thus activating the solenoid on the vent valve 104, closing such valve and allowing steam pressure to build up within chamber 12. At the same time, switch LS-1 is closed which, in turn, opens contacts HLC-1 hence de-activating elements 32 positioned beneath the displacement drum.

After the time control solenoid TCS has timed "out" the contacts TC-1 and TC-2 are opened thus sounding the alarm and de-activating latch solenoid 98 such that plunger 102 is withdrawn clear of control wheel 80. The displacement drum 40 is then rotated to position B allowing the cooking oil level to drop below the lower edge of the opening 41. As this happens, switches LS-1 and LS-2 are closed, with the result being that current can now flow through heating elements 32 and through the solenoid of vent valve 104 thereby allowing the pressure and steam to be released through the valve and through a suitable exhaust pipe (not shown) into the atmosphere.

Following the above, the closure assembly 46 is manually opened and the cooked food is removed by sliding the support rack outwardly in the horizontal direction.

The apparatus described above possesses numerous advantages. Some of these advantages are listed below as follows:

1. The apparatus is very simple to operate; the control wheel 80 and the various switches, stop means and latching means associated therewith not only provide for operator safety but also help to initiate the operation of the control circuitry.

2. The apparatus is safe and easy to handle in that the foodstuff is never immersed or withdrawn manually from the hot cooking oils.

3. The foodstuffs can be uniformly cooked to the desired degree in that the automatic control reduces the possibility of human error in the timing. The hot oil drains from the cooking region immediately after the cooking period and serves as a warmer if the foodstuffs are not immediately removed. It should be noted here that one of the advantages of the eccentrically mounted displacement drum is that such drum rotates by flotation to its upper position B substantially without manual intervention after the latching solenoid 98 has been activated. This action can be enhanced by locating the aperture in the control wheel 80 such that the displacement drum is slightly "off center" in the lower position A so that in such lower position there is a slight turning moment on the displacement drum at all times thus ensuring that it is rotated by flotation to the upper position as soon as the latching solenoid 98 has been activated.

4. A further advantage is that there is less handling of the foodstuff. Raw foodstuff is put directly on the stacking trays and such foodstuff need not to touched again manually until final packaging of the cooked foodstuff takes place.

5. The apparatus described may be constructed to have a relatively large capacity. It may be readily sized to accommodate up to 20 chickens or 180 pieces of chicken thus replacing the average conventional cooker which typically has a capacity of 2–4 chickens at a time.

6. The apparatus described saves on space in that one machine having a maximum capacity as noted above fits in an area of approximately three feet by four feet.

7. The apparatus described provides for relatively cool operation in that all pressure and steam may be easily vented to the outside and the machine may be provided with a coating of insulation to reduce heat losses and reduce air conditioning costs. The need for expensive exhaust hoods is eliminated.

8. The apparatus provides for low maintanence costs. Because of its simple mechanical design no pumps, electric motors or complicated filters are needed.

9. The apparatus provides for savings in labour in that only one or two machines are required for a typical "take-out" store, thus reducing the amount of manpower required.

Further advantages will be readily apparent to those skilled in the art. In addition, numerous modifications and changes may be made to the structure herein described without departing from the spirit and scope of the invention. In this regard it might be noted that although the term "cooking oil" or "fat" has been used in this specification for purposes of convenience, it is to be understood that the apparatus can be used with any suitable non-aqueous cooking liquid. For definitions of the invention, reference is to be had to the claims appended hereto.

I claim:

1. Apparatus for the cooking of foods comprising: a chamber for holding a volume of cooking oil and defining a cooking region therein for receiving food to be cooked; the chamber including a wall having an opening therethrough for placement of food into the cooking region of the chamber and removal of the food therefrom, means for supporting foodstuffs to be cooked within said chamber and means within said chamber for effecting relative movement between the foodstuff supporting means and the upper surface of the volume of cooking oil and movable between (a) a first position wherein, in use, with a selected amount of cooking oil in said chamber, the oil substantially surrounds the food to be cooked; and (b) a second position wherein the upper level of the selected amount of oil is below both the lower extremities of said opening and the food; said opening in said wall and said means for supporting foodstuff to be cooked within said chamber being positioned and arranged such that, in use, the food may be inserted and removed from the cooking region of the chamber in a lateral or horizontal direction; said cooking chamber being capable of withstanding internal pressures during the cooking of the food, and movable closure means associated with said opening in said wall and sealingly engageable with the chamber to prevent leakage when under pressure during cooking.

2. The apparatus according to claim 1 including heating means within said chamber for supplying heat to the cooking oil.

3. The apparatus according to claim 1 further including means for venting said chamber after the cooking of the food to relieve the pressure in said chamber, and safety stop means preventing opening of said chamber closure means until the relative movement means is in the second position.

4. The apparatus according to claim 3 including means accessible from a location externally of said chamber for effecting said relative movement between the foodstuff supporting means and the upper surface of the cooking oil, latch means for holding said relative movement means in the first position and means for releasing said latch means to allow said relative movement means to move to the second position.

5. The apparatus according to claim 4 including control circuit means for timing the cooking of the food, controlling the temperature of the cooking oil, and activating said means for releasing said latch means after the cooking of the food.

6. The apparatus according to claim 1, 2, 3, 4 or 5 wherein said means for effecting relative movement comprises displacement means movable between said first and second positions, said relative movement means comprising a body of selected volume mounted within said chamber for movement between said first and second positions, and means accessible from a location externally of said chamber for effecting said movement of said body.

7. The apparatus according to claim 5 wherein said means accessible from a location externally of the chamber comprise a control wheel and cam means on said control wheel for activating said control circuit and controlling the functioning of the safety stop means.

* * * * *